United States Patent
Cronin et al.

(10) Patent No.: US 9,792,329 B1
(45) Date of Patent: Oct. 17, 2017

(54) MOOD-BASED CONTENT

(71) Applicant: Rich Media Ventures, LLC, Miami, FL (US)

(72) Inventors: John Cronin, Bonita Springs, FL (US); Neil Balthaser, Montreal (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

(21) Appl. No.: 15/142,129

(22) Filed: Apr. 29, 2016

(51) Int. Cl.
*G06F 17/30* (2006.01)
*G06Q 30/02* (2012.01)

(52) U.S. Cl.
CPC .. *G06F 17/30528* (2013.01); *G06F 17/30604* (2013.01); *G06Q 30/0269* (2013.01)

(58) Field of Classification Search
CPC ............ H04N 21/458; G06F 17/30528; G06F 17/30604; G06Q 30/0269; G06Q 30/02
See application file for complete search history.

(56) References Cited

U.S. PATENT DOCUMENTS

| | | | |
|---|---|---|---|
| 2002/0132616 A1* | 9/2002 | Ross | H04M 1/05 455/419 |
| 2005/0021420 A1 | 1/2005 | Michelitsch et al. | |
| 2007/0094686 A1 | 4/2007 | Kim et al. | |
| 2007/0162606 A1 | 7/2007 | Chen et al. | |
| 2012/0124456 A1* | 5/2012 | Perez | G06Q 30/02 715/200 |
| 2013/0173526 A1* | 7/2013 | Wong | H04N 21/458 706/54 |
| 2014/0143064 A1* | 5/2014 | Tran | A61B 5/0022 705/14.66 |
| 2015/0066950 A1* | 3/2015 | Tobe | G06Q 50/01 707/748 |
| 2015/0135077 A1* | 5/2015 | Fuzell-Casey | G06F 17/30817 715/719 |
| 2015/0181291 A1* | 6/2015 | Wheatley | H04N 21/4542 725/10 |
| 2016/0078353 A1* | 3/2016 | Shen | G06Q 50/01 706/12 |

OTHER PUBLICATIONS

U.S. Appl. No. 15/142,124 Office Action mailed Sep. 23, 2016.
U.S. Appl. No. 15/142,124 Final Office Action mailed Mar. 29, 2017.
U.S. Appl. No. 15/142,124 Office Action dated Aug. 4, 2017.

* cited by examiner

*Primary Examiner* — Tarek Chbouki
(74) *Attorney, Agent, or Firm* — Polsinelli LLP (57) ABSTRACT

The present invention includes systems and method for providing mood-based content. User data may be collected via biosensors and manual input by a user. User data may be processed to determine the user's current mood. Information regarding the user's current mood may be used to identify content associated with the user's current mood. The identified content may be used to update content for display. The updated content may be displayed to the user.

21 Claims, 6 Drawing Sheets

A 2014 Mercedes

It can take you to your destination.

A 2014 Mercedes is the first step to finding what you're missing.

It can take you to your Happy Place.

A 2014 Mercedes is the best way to spice up your life.

If you need excitement, it can take you to your destination.

MOOD-BASED CONTENT

BACKGROUND OF THE INVENTION

1. Field of the Invention

The present invention relates generally to targeting users with personalized content. More specifically, the present invention relates to updating content based on data regarding a user's current mood.

2. Description of the Related Art

Content providers currently have a variety of options for personalizing content for distribution. Content providers can collect personal attribute information, such as age, gender, and geographic location. Content providers can also track information regarding a user's viewing habits using techniques such as HTTP cookies. Content providers can also collect personal information through user surveys.

It is difficult, however, to provide content personalized based on a user's current mood. Because a user's mood may change, it is difficult for content providers to provide well-targeted content. It is also difficult to ensure data regarding a user's mood is accurate. A user, for example, may convey a "happy" mood through social media in order to maintain a facade. Content updated based on such data would not be well-targeted for a user who is actually "sad."

There is a need in the art for improved systems and methods for providing mood-based content.

SUMMARY OF THE CLAIMED INVENTION

One exemplary method for providing mood-based content describes receiving user mood data sent over a communication network from a user device. The user mood data is associated with a user. The method also describes executing instructions stored in memory. Execution of the instructions by the processor processes the user mood data to identify one or more current moods of the user; performs a search of a database for mood-based content corresponding to the one or more current moods; and modifies current content using mood-based content. The method also describes providing to the user device over the communication network the modified content for display.

One exemplary system for providing mood-based content provides a communication interface and a processor. The communication interface communicates over a communication network. The communication interface receives user mood data from a user device. The user mood data is associated with a user. Execution of instructions stored in the memory by the processor performs a set of operations. The operations include processing the user mood data to identify one or more current moods of the user. The operations also include performing a search of a database for mood-based content corresponding to the one or more current moods. The operations also include modifying current content using mood-based content. The communication interface provides to the user device over the communication network the modified content for display.

One exemplary non-transitory computer-readable storage medium is also described, the non-transitory computer-readable storage medium having embodied thereon a program executable by a processor to perform an exemplary method for providing mood-based content. The exemplary program method describes receiving user mood data sent over a communication network from a user device. The user mood data is associated with a user. The program method also describes processing the user mood data to identify one or more current moods of the user. The program method also describes performing a search for mood-based content corresponding to the one or more current moods. The program method also describes modifying current content using mood-based content. The program method also describes providing to the user device over the communication network the modified content for display.

DETAILED DESCRIPTION

The present invention includes systems and method for providing mood-based content. User data may be collected via biosensors and manual input by a user. User data may be processed to determine the user's current mood. Information regarding the user's current mood may be used to identify content associated with the user's current mood. The identified content may be used to update content for display. The updated content may be displayed to the user.

Rich media, as used in the present disclosure, refers to content that may include not only text (i.e. words) or images (i.e. pictures) to convey information to the user, but may also include or utilize a variety of advanced features such as video and audio that encourages viewers to interact and engage with the content being viewed. The content discussed herein may include a variety of rich media, as well as traditional text or image content.

Figure 1:
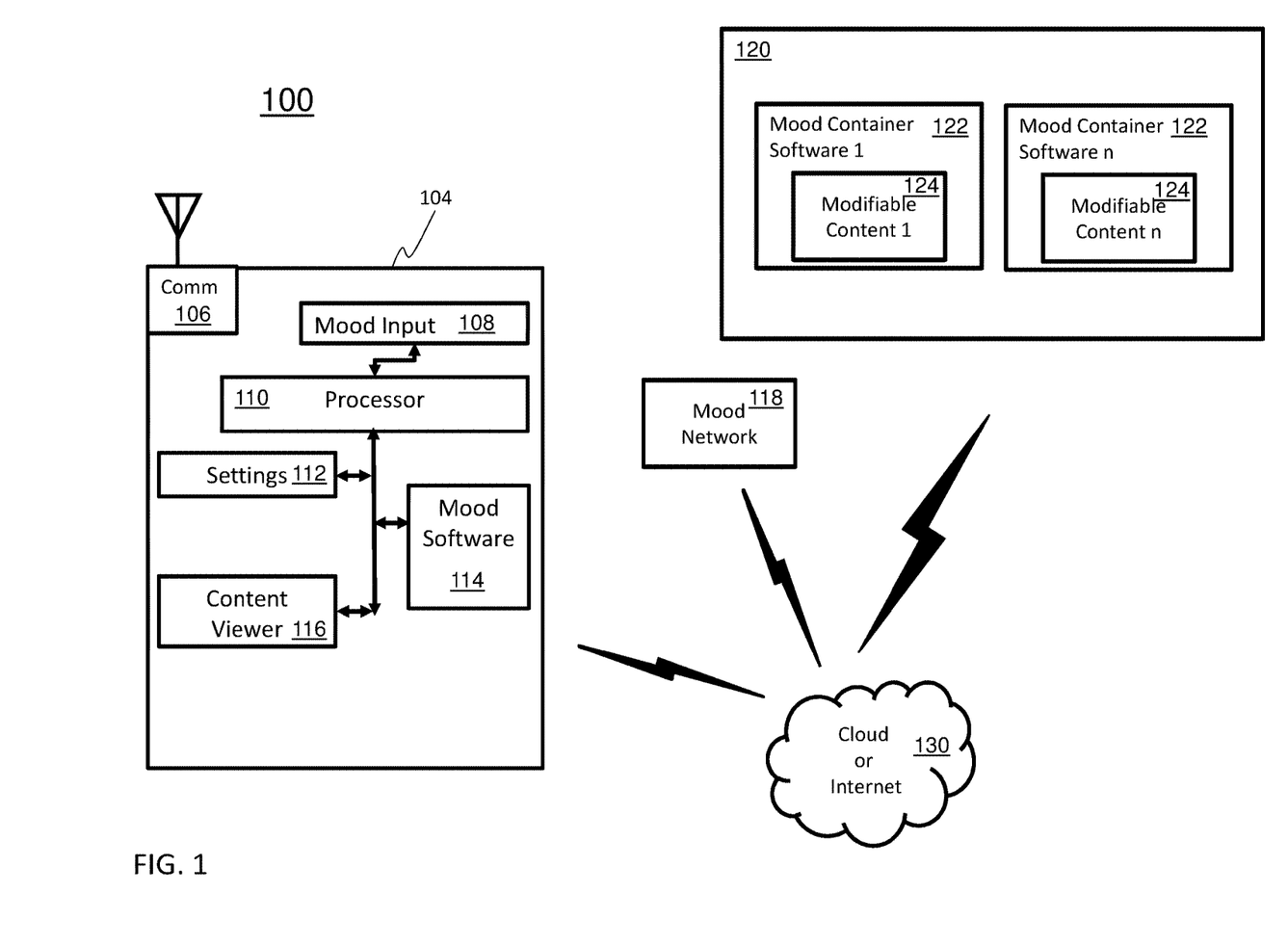
FIG. 1 illustrates an environment in which a system for providing mood-based content may be implemented.

FIG. 1 illustrates an environment 100 in which a system for providing mood-based content may be implemented. The environment 100 of FIG. 1 may include a user device 104, a mood network 118, a content network 120, and a communication network 130 (e.g., the cloud or Internet). The user device 104 may include a communication subsystem 106, a mood input subsystem 108, a processor 110, a settings subsystem 112, a mood software 114, and a content viewer subsystem 116. The communication subsystem 106 may include one or more wireless communication units. The communication subsystem 106 may include an antenna. The content network 120 may include a plurality of mood container software 122. Each mood container software 122 may include modifiable content 124. Each mood container software 122 may include one or more mood profiles, wherein the respective modifiable content 124 may be modified based on one or more mood profiles. The content network 120 may also include a mood content database (not shown).

The user device 104 may communicate through the communication network 130 using the communication subsystem 106. The communication subsystem 106 may communicate using one or more wireless communication units. The communication subsystem 106 may communicate using the antenna.

The mood input subsystem 108 may provide user mood data collected through one or more wearable devices. The mood input subsystem 108 may also provide user mood data collected through the user device 104. The one or more wearable devices may be paired with the user device 104, such that the one or more wearable devices and the user device 104 are communicatively connected.

The settings subsystem 112 may provide mood settings to a user for selection. The settings subsystem 112 may also integrate mood settings into a settings menu of the user device 104. A user may use mood settings to select one or more mood input sources. A user may also use mood settings to select one or more mood input destinations.

The mood software 114 may provide user mood data for transmission. The mood software 114 may provide user mood data from the mood input subsystem 108. The mood software 114 may provide user mood data for transmission according to the one or more input destinations selected through the mood settings. The mood software 114, for example, may provide user mood data for transmission to the content network 120 when a user makes a selection to allow mood inputs to ads. The mood software 114 may provide user mood data for transmission according input source of the respective mood data. The mood software 114, for example, may provide user mood data for transmission to the content network 120 when mood data is inputted to the user device 104 through manual input. The mood software 114 may also allow the content viewer subsystem 116 to receive content for display. The processor 110 may be used to run the user device 104. The user device 104 may include memory used to store instructions and data for execution by the processor 110.

User mood data may be transmitted from the user device 104 to the content network 120. User mood data may be transmitted from one or more wearable devices (not shown) to the content network 120. User mood data may also be transmitted from one or more wearable devices to the content network 120 via the user device 104. User mood data may also be transmitted to the mood network 118. User mood data may be transmitted to the mood network 118 from the one or more wearable devices, the user device 104, or combinations thereof.

The mood network 118 may aggregate mood data to generate additional user mood data. Additional mood data may include inferences made from aggregated mood data, such that the mood network 118 may provide accurate inferences regarding a user's mood using the user's prior mood inputs. Generated mood data may be transmitted to the content network 120. Generated mood data may be identified as "private" mood data.

The content network 120 may receive user mood data from the user device 104, the one or more wearable devices, the mood network 110, or combinations thereof. User mood data may be received by one or more mood container software 122 for processing. A mood container software 122 may provide modified content, wherein the modified content is modified from the respective modifiable content 124. The mood container software 122 may provide modified content for display to the user. The mood container software 122 may provide modified content to the user device 104, one or more display devices, or combinations thereof. The user device 104 may provide to one or more display devices modified content received from the mood container software 122. The modified content may be provided to the content viewer 116 subsystem for display.

The user device 104 may be any type of computing device capable of communicating over the communication network 130. Such a computing device may include general purpose computers, mobile phones, smartphones, personal digital assistants (PDAs), portable computing devices (e.g., laptop, netbook, tablets), desktop computing devices, and handheld computing devices.

Figure 2A:
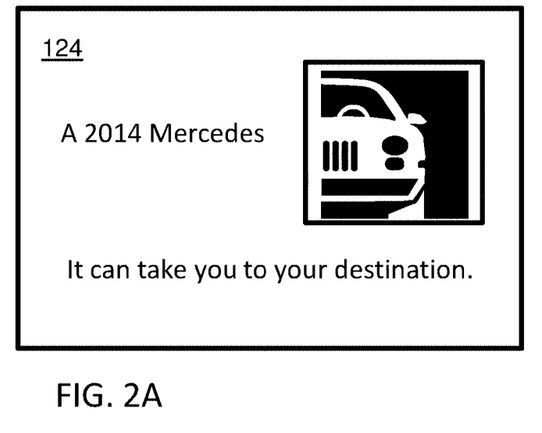
FIG. 2A illustrates a modifiable content.

FIG. 2A illustrates a modifiable content 124. The modifiable content 124 of FIG. 2A may include text, one or more images, or combinations thereof. The modifiable content 124 may be an advertisement. The modifiable content 124, for example, may include a product name, a product image, and a slogan. The modifiable content 124 may be modified using a respective mood container software 122. The modifiable content 124 may be modified based on user mood data. User mood data may be identified as "private" mood data or "public" mood data. Content modified for a "sad" user, for example, may acknowledge the user's "sad" mood. Content may be modified to target a combination of varying user mood data. Modified content may reference a user's sadness and disappointment, for example, when "private" mood data indicates the user is "sad" and "public" mood data indicates the user is "disappointed."

The modifiable content 124 may also be modified based on a delivery means, wherein the delivery means may be the means through which respective content may be delivered to a user. Content modified for delivery to a user device, for example, may be different from content modified for delivery to a public billboard. Messaging included in modifiable content 124, for example, may reference "sad" emotions when "private" mood data indicates a user may be "sad," "public" mood data indicates the user may be "happy," and modified content may only be visible to the user. Messaging included in modifiable content 124 may not reference "sad" emotions, for example, when "private" mood data indicates a user may be "sad," "public" mood data indicates the user may be "happy," and modified content may be visible to the public. Such modification may be desired by a user, for example, when the user is "sad," but does not want onlookers to infer the user's "sad" mood by seeing the modified content displayed for the user.

Figure 2B:
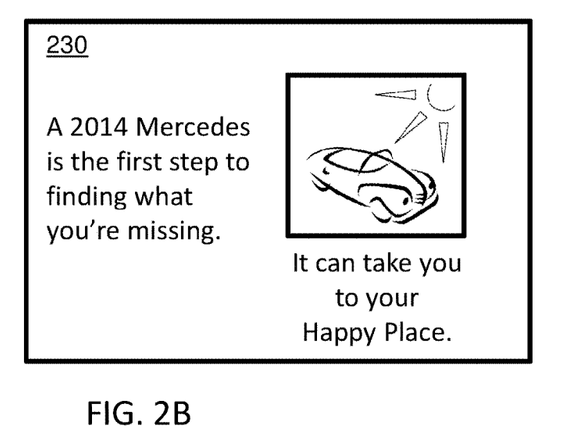
FIG. 2B illustrates an exemplary modified modifiable content.

FIG. 2B illustrates an exemplary modified modifiable content 230. The content of FIG. 2B may have been generated by modifying the content 124 of FIG. 2A, wherein the modifiable content 124 may have been modified based on "private" mood data indicating a "sad" mood and "public" mood data indicating a "happy" mood. The modified content 230 may include modified text, one or more modified images, or combinations thereof. The modified content 230, for example, may include messaging targeting a "sad" user who may desire to be "happy." The product image may be modified to a sunlit image, for example, when the user is a "sad" user who may desire to be "happy." The product name, for example, may be placed into a phrase modified for a "sad" user who may desire to be "happy" (e.g., "A 2014 Mercedes is the first step to finding what you're missing"). The modifiable content 124, for example, may be modified to include a slogan targeting a "sad" user who may desire to be "happy" (e.g., "It can take you to your Happy Place").

Figure 2C:
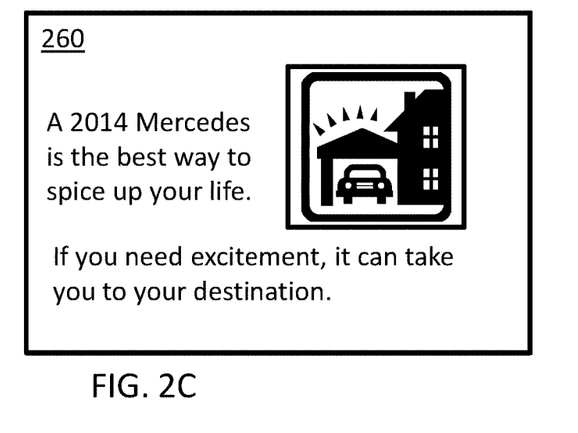
FIG. 2C illustrates another exemplary modified modifiable content.

FIG. 2C illustrates another exemplary modified modifiable content 260. The content of FIG. 2C may have been generated by modifying the content 124 of FIG. 2A, wherein the modifiable content 124 may have been modified based on "private" mood data indicating a "bored" mood and "public" mood data indicating a "excited" mood. The modified content 260 may include modified text, one or more modified images, or combinations thereof. The modified content 260, for example, may include messaging targeting a "bored" user who may desire to be "excited." The product image may be modified to convey excitement, for example, when the user is a "bored" user who may desire to be "excited." The product name, for example, may be placed into a phrase modified for a "bored" user who may desire to be "excited" (e.g., "A 2014 Mercedes is the best way to spice up your life"). The modifiable content 124, for example, may be modified to include a slogan targeting a "bored" user who may desire to be "excited" (e.g., "If you need excitement, it can take you to your destination").

Figure 3:
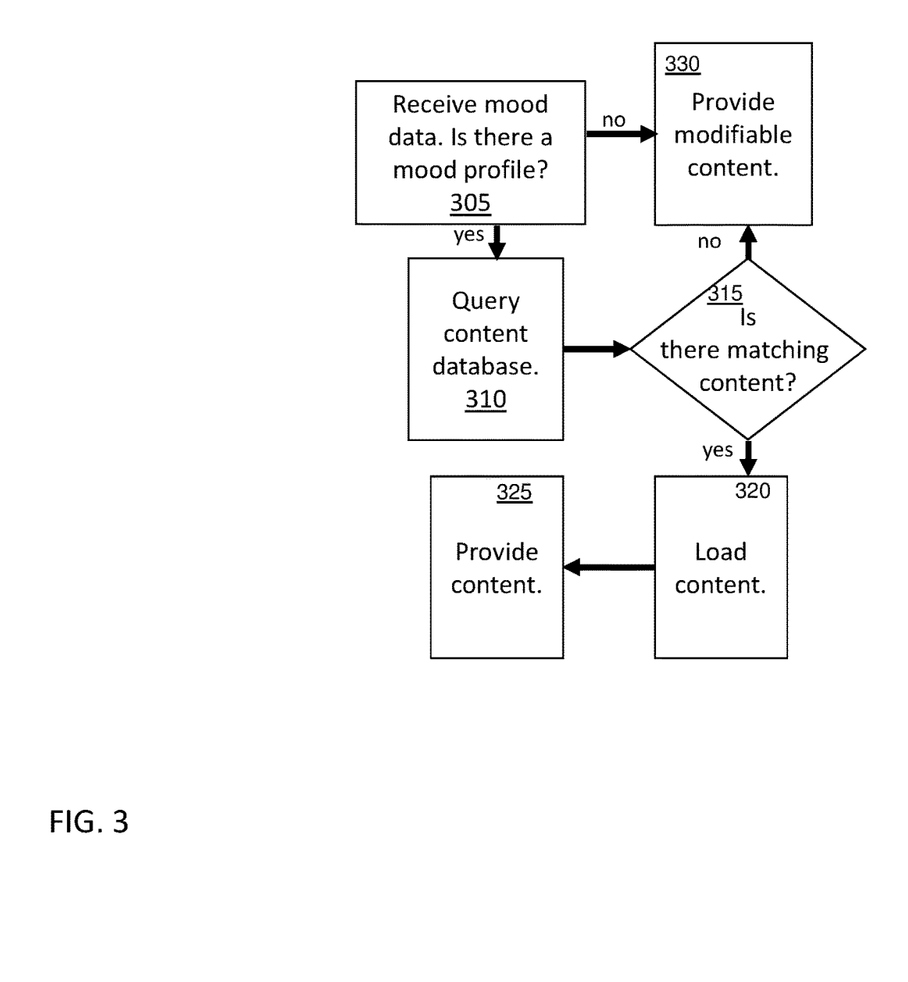
FIG. 3 illustrates a workflow for providing display content.

FIG. 3 illustrates a workflow 300 for providing display content. In step 305 of FIG. 3, at least one mood container software 122 may receive mood data transmitted via the communication network 130. Mood data may be "private" mood data, "public" mood data, or combinations thereof. Mood data may indicate one or more user moods. The workflow 300 may continue to step 310 when at least one mood container software 122 includes one or more mood profiles corresponding to at least one indicated user mood. A mood container software 122, for example, may receive mood data indicating a "sad" user mood and include a mood profile for a "sad" mood.

A mood container software 122 may include a mood profile addressing discrepancies between "private" mood data and "public" mood data. A mood container software 122, for example, may include a mood profile for a "sad" user who desires to be "happy" (e.g., the user provides "private" mood data indicating a "sad" mood and provides "public" data indicating a "happy" mood).

A mood container software 122 may include a mood profile reconciling variances amongst mood data input. A mood container software 122, for example, may include a mood profile for a combination of a "sad" mood and a "disappointed" mood (e.g., a "private" mood of "sad" and a "public" mood of "disappointed"). The workflow 300 may continue to step 330 when the mood container software 122 is devoid of mood profiles corresponding to the one or more indicated user moods.

In step 310, the mood container software 122 may query a mood content database for content corresponding to at least one of the one or more user moods, wherein content may be modified content corresponding to the respective modifiable content 124. The mood container software' 122, for example, may query the mood content database for content used to modify the respective modifiable content'. The mood content database, for example, may provide content associated with a "sad" mood profile. The mood content database may include content corresponding to a plurality of user moods and mood combinations.

In step 315, the workflow 300 may continue to step 330 when the mood content database is devoid of content corresponding to the one or more user moods. The workflow 300 may continue to step 320 when the mood content database includes content corresponding to at least one user mood. For example, the mood container software 122 may receive "private" mood data indicating a "sad" mood and "public" mood data indicating a "happy" mood; and the mood content database may include content corresponding to a "sad" mood.

The mood content database may include content addressing discrepancies between "private" mood data and "public" mood data. The mood content database, for example, may include content corresponding to a combination of a "private" mood of "sad" and a "public" mood of "happy." The mood content database may include content reconciling variances amongst mood data input. The mood content database, for example, may include content corresponding to a combination of a "private" mood of "sad" and a "public" mood of "disappointed."

In step 320, the mood container software 122 may load content identified from the database query. The loaded content may provide a modified version of the corresponding modifiable content 124. The mood container software 122 may use the loaded content to provide modified content addressing at least one user mood.

In step 325, the mood container software 122 may provide the modified content for display. The modified content may be provided to at least one device for display. The modified content may be provided to the user device 104 for display. The modified content may be provided to a billboard, for example, and displayed when the user is within a predetermined distance from the billboard. The modified content, for example, may be provided to both the billboard and the user device 104.

In step 330, the mood container software may provide modifiable content 124 for display. The modifiable content 124 may be provided to at least one device for display. The modifiable content 124 may be provided to the user device 104 for display. The billboard may display the modifiable content, for example, when the mood content database is devoid of content applicable to the user's mood.

Figure 4A:
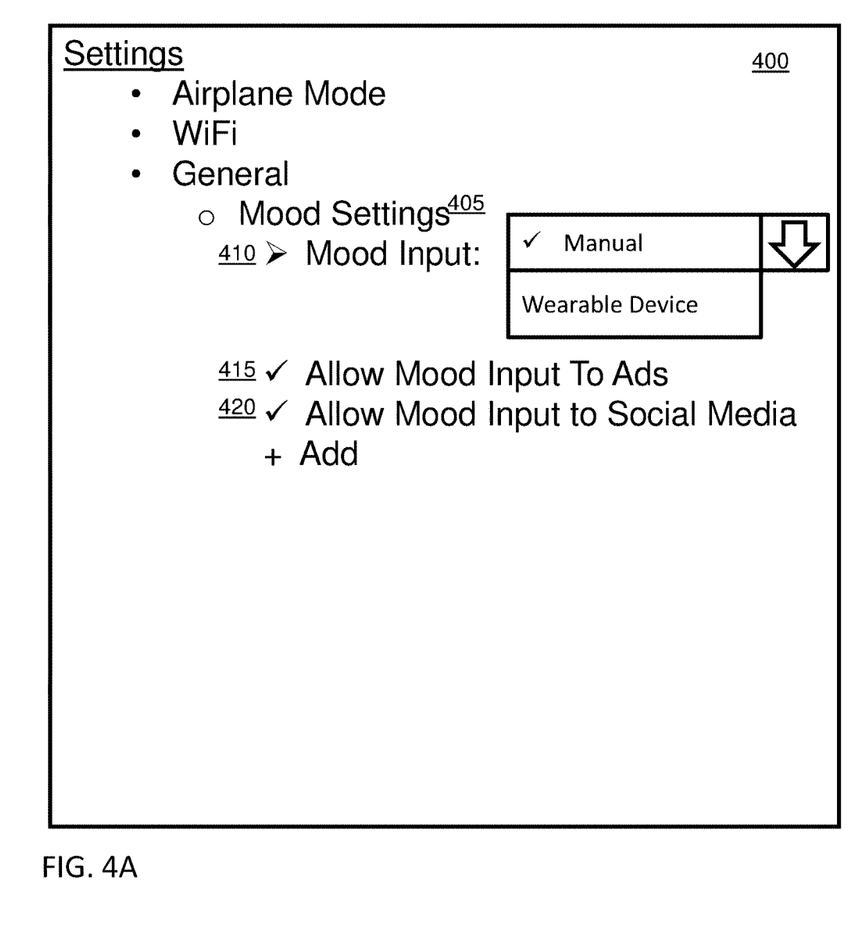
FIG. 4A illustrates a settings graphical user interface.

FIG. 4A illustrates a settings graphical user interface (GUI) 400. The settings GUI of FIG. 4A may include one or more mood settings 405. The one or more mood settings 405 may include a mood input option 410. The one or more mood settings 405 may also include an allow input to ads option 415 and an allow input to social media option 420. The settings GUI 400 may be integrated into a settings menu of a user device 104.

A user may control the means through which mood input data may be provided to the content network 120 using the mood input option 410. A user who desires to provide mood data through manual input may select a manual option from the mood input option 410. A user may provide mood data through manual input, for example, by selecting the user's current mood from a user device GUI.

Mood data provided via manual input may be used as "public" mood data. A user who does not desire to use manual input data as "public" mood data may use the settings GUI 400 to control use of manual input data. Manual input data, for example, may be used as "private" mood data when a user changes use settings through the settings GUI 400.

A user who desires to provide mood data through one or more wearable devices may select wearable device from the mood input option 410. A user may provide mood data through one or more wearable devices, for example, by wearing the user device 104. A user may provide mood data through one or more wearable devices, for example, by pairing a wearable device with the user device 104 and wearing the wearable device.

Mood data provided via one or more wearable devices may be used as "private" mood data. A user who does not desire to use such input data as "private" mood data may use the settings GUI 400 to control use of input data. Input data from one or more wearable devices, for example, may be used as "public" mood data when a user changes use settings through the settings GUI 400.

A user who desires mood-based advertising may select the allow input to ads option 415. The allow input to ads option 415 may allow the content network 120 to modify modifiable content 124 for ads. Mood input may be transmitted to the content network 120 from the user device 104, from one or more wearable devices, from the mood network 110, or combinations thereof.

A user who desires to provide mood data to one or more social media services (e.g., Facebook, Twitter, Instagram) may select the allow input to social media option 420. Mood input may be transmitted to the one or more social media services from the user device 104, from one or more wearable devices, from the mood network 110, or combinations thereof.

Figure 4B:
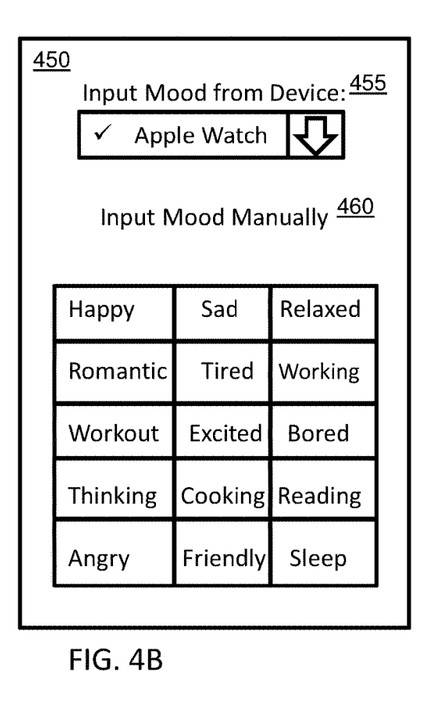
FIG. 4B illustrates an input graphical user interface.

FIG. 4B illustrates an input graphical user interface (GUI) 450. The input GUI 450 of FIG. 4B may include an input device selection section 455 and a mood input selection section 460. The input GUI 450 may be accessed from the user device 104. A user may also access the input GUI 450 by logging into a user account.

A user who desires to provide mood data through one or more wearable devices may select the one or more wearable devices using the input device selection section 455. A user who desires to provide mood data through manual input may select one or more moods using the mood input selection section 460. The one or more selected moods may remain selected for a predetermined period of time, after which the one or more selected moods are automatically deselected and no longer used as mood input data.

Figure 5:
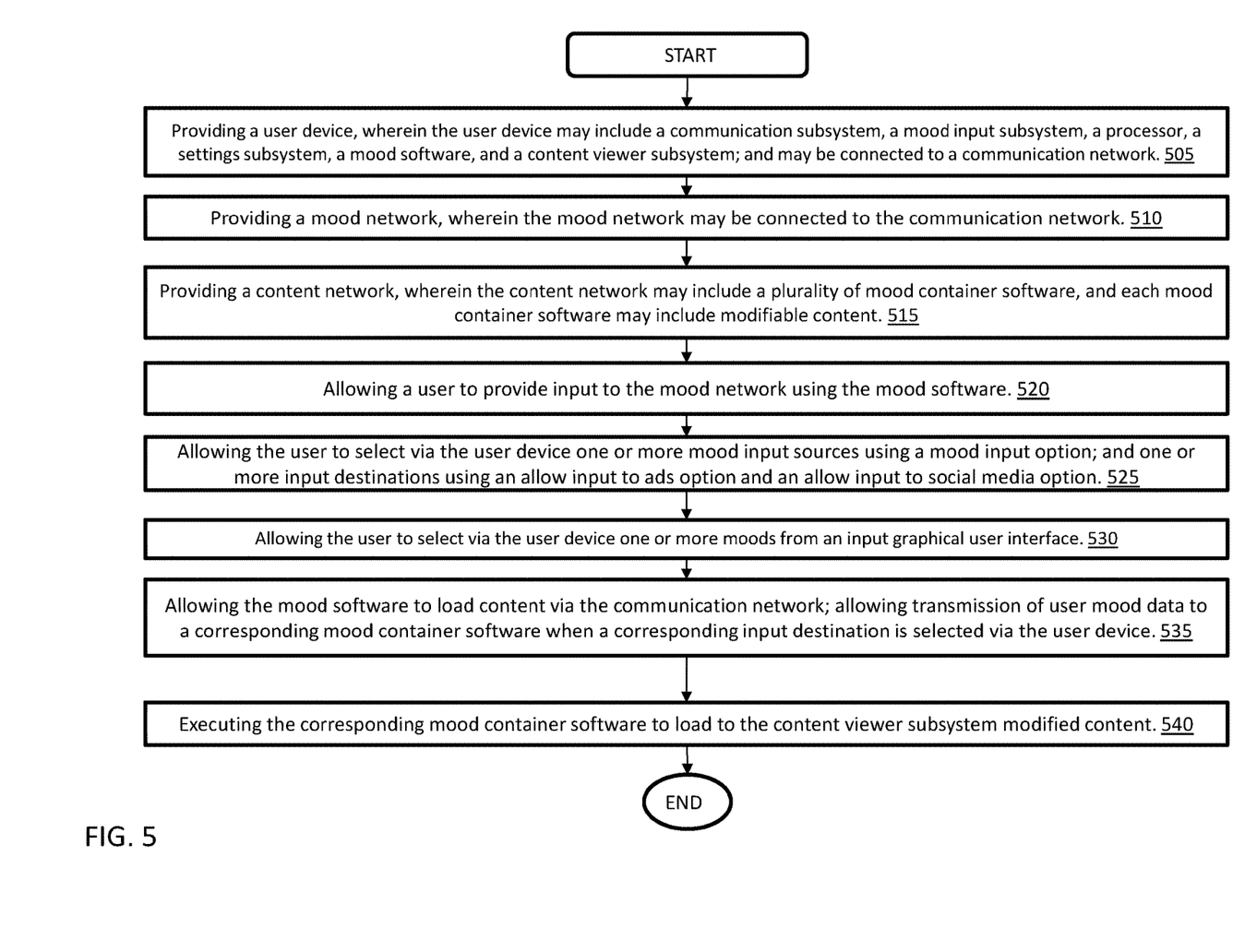
FIG. 5 illustrates a method for providing mood-based content.

FIG. 5 illustrates a method 500 for providing mood-based content. The method 500 of FIG. 5 may include, at block 505, providing a user device 104, wherein the user device 104 may include a communication subsystem 106, a mood input subsystem 108, a processor 110, a settings subsystem 112, a mood software 114, and a content viewer subsystem 116; and may be connected to a communication network 130. The method 500 may include, at block 510, providing a mood network 118, wherein the mood network 118 may be connected to the communication network 130. The method 500 may include, at block 515, providing a content network 120, wherein the content network 120 may include a plurality of mood container software 122, and each mood container software 122 may include modifiable content 124.

The method 500 may include, at block 520, allowing a user to provide input to the mood network 118 using the mood software 114, wherein input may be provided to the mood network 118 via one or more wearable devices. Input may also be provided to the mood network 188 via input for one or more social media services.

The method 500 may include, at block 525, allowing the user to select via the user device 104 one or more mood input sources using a mood input option 410 and one or more input destinations using an allow input to ads option 415 and an allow input to social media option 420.

The method 500 may include, at block 530, allowing the user to select via the user device 104 one or more moods from an input graphical user interface 450, wherein the one or more selected moods may be transmitted as "public" mood data.

The method 500 may include, at block 535, allowing the mood software 114 to load content via the communication network 130; and allowing transmission of user mood data to a corresponding mood container software 122 when a corresponding input destination is selected via the user device 104. The mood software 114, for example, may load advertising content for Mercedes and allow transmission of user mood data to a mood container software 122 associated with the loaded advertising content when the allow input to ads option 415 is selected.

The method 500 may include, at block 540, executing the corresponding mood container software 122 to load to the content viewer subsystem 116 content modified using the transmitted user mood data.

Figure 6:
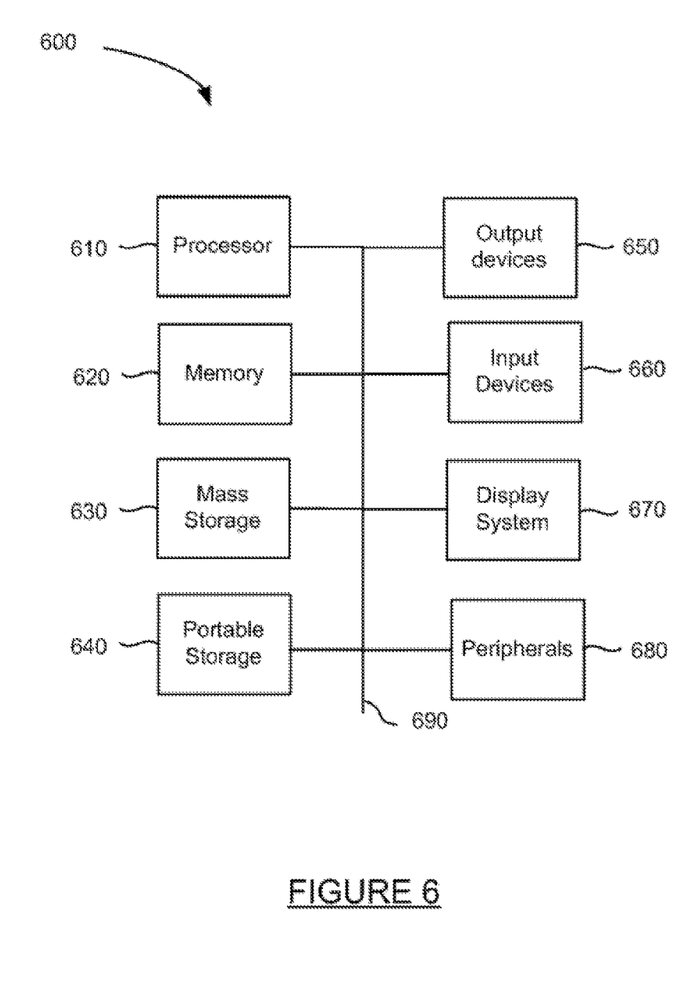
FIG. 6 is a block diagram of an exemplary computing device that may be used to implement an embodiment of the present invention.

FIG. 6 illustrates an exemplary computing system 600 that may be used to implement an embodiment of the present invention. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing mood-based content, the method comprising:
   receiving a plurality of user mood data inputs sent over a communication network from one or more user devices associated with a user, wherein each user mood data input is characterized in accordance with one or more mood settings as public mood data or private mood data, the mood settings being specific to the user and entered via a respective user interface of the one or more user devices;
   executing instructions stored in memory, wherein execution of the instructions by the processor:
     processes the user mood data inputs to identify one or more current moods of the user, wherein the one or more current moods correspond to a stored mood profile that includes the private mood data and the public mood data as characterized in accordance with the mood settings specific to the user,
     performs a search of a database for mood-based content corresponding to the mood profile, wherein the mood profile indicates a discrepancy between the private mood data and the public mood data, and
     modifies current content to include the mood-based content corresponding to the mood profile, wherein the current content is modified in accordance with a different mood profile that includes different mood-based content; and
   providing to the user device over the communication network the modified content for display.

2. The method of claim 1, wherein at least one user mood data input is received from one of a user device and a wearable device.

3. The method of claim 2, wherein at least one user mood data input is received from one or more biosensors included in the wearable device.

4. The method of claim 1, wherein the modified content is provided to one or more display devices and the user device for display.

5. The method of claim 4, wherein the modified content provided to a display device is different from the modified content provided to the user device.

6. The method of claim 5, wherein the display device is a public display device.

7. The method of claim 1, wherein the modified content includes an advertisement selected based on the mood profile.

8. A system for providing mood-based content, the system comprising:
   a communication interface that communicates over a communication network, wherein the communication interface receives a plurality of user mood data inputs from one or more user devices associated with a user, wherein each user mood data input is characterized in accordance with one or more mood settings as public mood data or private mood data, the mood settings being specific to the user and entered via a respective user interface of the one or more user devices;
   a memory; and
   a processor that executes instructions stored in the memory, wherein execution of the instructions by the processor:
     processes the user mood data to identify one or more current moods of the user, wherein the one or more current moods correspond to a stored mood profile that includes the private mood data and the public mood data as characterized in accordance with the mood settings specific to the user,
     performs a search of a database for mood-based content corresponding to the mood profile, wherein the mood profile indicates a discrepancy between the private mood data and the public mood data, and
     modifies current content to include the mood-based content corresponding to the mood profile, wherein the current content is modified in accordance with a different mood profile that includes different mood-based content, and the communication interface provides to the user device over the communication network the modified content for display.

9. The system of claim 8, wherein at least one user mood data input is received from one of a user device and a wearable device.

10. The system of claim 9, wherein at least one user mood data input is received from one or more biosensors included in the wearable device.

11. The system of claim 8, wherein the modified content is provided to one or more display devices and the user device for display.

12. The system of claim 11, wherein the modified content provided to a display device is different from modified content provided to the user device.

13. The system of claim 12, wherein the display device is a public display device.

14. The system of claim 8, wherein the modified content includes an advertisement selected based on the mood profile.

15. A non-transitory computer-readable storage medium having embodied thereon a program executable by a processor to perform a method for providing mood-based content, the method comprising:
   receiving a plurality of user mood data inputs sent over a communication network from one or more user devices associated with a user, wherein each user mood data input is characterized in accordance with one or more mood settings as public mood data or private mood data, the mood settings being specific to the user and entered via a respective user interface of the one or more user devices;
   processing the user mood data user inputs to identify one or more current moods of the user, wherein the one or more current moods correspond to a stored mood profile that includes the private mood data and the public mood data, as characterized in accordance with the mood settings specific to the user;
   performing a search for mood-based content corresponding to the mood profile, wherein the mood profile indicates a discrepancy between the private mood data and the public mood data;
   modifying current content to include the mood-based content corresponding to the mood profile, wherein the current content is modified in accordance with a different mood profile that incorporates different mood-based content; and providing to the user device over the communication network the modified content for display.

16. The non-transitory computer-readable storage medium of claim 15, wherein at least one of the user mood data inputs is received from one of a user device and a wearable device.

17. The non-transitory computer-readable storage medium of claim 15, wherein the modified content is provided to one or more display devices and the user device for display.

18. The non-transitory computer-readable storage medium of claim 17, wherein the modified content provided to a display device is different from modified content provided to the user device.

19. The non-transitory computer-readable storage medium of claim 18, wherein the display device is a public display device.

20. The non-transitory computer-readable storage medium of claim 15, wherein the modified content includes an advertisement selected based on the mood profile.

21. A method for providing mood-based content, the method comprising:
  storing a plurality of mood-based content sets in memory, wherein each mood-based content set is specific to a current mood and a desired mood;
  receiving a plurality of user mood data inputs sent over a communication network from one or more user devices associated with a user, wherein each user mood data input is characterized in accordance with one or more mood settings as public mood data or private mood data, the mood settings being specific to the user and entered via a respective user interface of the one or more user devices;
  executing instructions stored in memory, wherein execution of the instructions by the processor:
    processes the user mood data inputs to identify one or more current moods of the user, wherein the one or more current moods correspond to user mood data inputs characterized as private mood data,
    identifies one or more desired moods of the user, wherein the one or more desired moods correspond to user mood data inputs characterized as public mood data
    performs a search of a database for mood-based content corresponding to the mood profile, wherein the mood profile indicates a discrepancy between the identified current moods and the identified desired moods, and
    modifies current content to include the mood-based content corresponding to the mood profile, wherein the current content is modified in accordance with a different mood profile that includes different mood-based content; and
  providing to the user device over the communication network the modified content for display.

* * * * *